(12) United States Patent
Marcantonio

(10) Patent No.: US 9,260,142 B2
(45) Date of Patent: Feb. 16, 2016

(54) SHIPPING CONTAINER TRANSPORT SYSTEM

(71) Applicant: Ralph M. Marcantonio, New Braunfels, TX (US)

(72) Inventor: Ralph M. Marcantonio, New Braunfels, TX (US)

(*) Notice: Subject to any disclaimer, the term of this patent is extended or adjusted under 35 U.S.C. 154(b) by 104 days.

(21) Appl. No.: 14/262,676

(22) Filed: Apr. 25, 2014

(65) Prior Publication Data

US 2015/0307143 A1   Oct. 29, 2015

(51) Int. Cl.
| | |
|---|---|
| *B62D 53/06* | (2006.01) |
| *B60D 1/52* | (2006.01) |
| *B60D 1/66* | (2006.01) |
| *B60D 1/28* | (2006.01) |
| *B60D 1/18* | (2006.01) |
| *B66C 23/42* | (2006.01) |
| *B60D 1/00* | (2006.01) |

(52) U.S. Cl.
CPC .............. *B62D 53/064* (2013.01); *B60D 1/187* (2013.01); *B60D 1/28* (2013.01); *B60D 1/52* (2013.01); *B60D 1/665* (2013.01); *B66C 23/42* (2013.01); *B60D 2001/001* (2013.01)

(58) Field of Classification Search
CPC ........ B62D 53/064; B60D 1/187; B60D 1/28; B60D 1/52; B60D 1/665; B60D 2001/001; B66C 23/42
USPC ......... 414/458, 462, 498, 478, 480, 482, 483, 414/484, 494, 500; 280/441.2, 417.1, 280/425.2; 410/71, 73, 76, 82
See application file for complete search history.

(56) References Cited

U.S. PATENT DOCUMENTS

| | | | | |
|---|---|---|---|---|
| 4,372,572 A * | 2/1983 | Verschage | ............ | B62D 53/065 280/441.2 |
| 4,832,358 A * | 5/1989 | Bull | ..................... | B62D 53/061 280/418.1 |
| 5,924,836 A * | 7/1999 | Kelly | ................... | B62D 63/061 280/402 |
| 6,203,046 B1 * | 3/2001 | Meurer | ................ | B62D 53/061 280/417.1 |
| 7,878,524 B1 * | 2/2011 | Hemmingsen | ....... | B62D 53/062 280/415.1 |
| 8,353,521 B1 * | 1/2013 | Seeley | ................... | B60D 1/665 280/417.1 |
| 2007/0003398 A1 * | 1/2007 | Hernandez | ................ | B60P 1/28 414/483 |
| 2008/0260507 A1 * | 10/2008 | Hernandez | ............. | B60D 1/465 414/462 |

* cited by examiner

*Primary Examiner* — Kaitlin Joerger
(74) *Attorney, Agent, or Firm* — Wayne J. Colton, Inc.

(57) ABSTRACT

A container transport system includes a gooseneck assembly for towing by a medium duty truck and a dolly for supporting the weight of an intermodal freight container. The gooseneck assembly includes a pair of platforms each configured to support a corner casting of the transported intermodal freight container and having a post matingly received through a bottom orifice of the supported corner casting. A hoist assembly is provided to lift an end of the intermodal freight container for placing the container on the dolly or removing the container from the dolly. A pair of barrel slide bolt assemblies is provided for securing the intermodal freight container in place atop the platforms. In order to facilitate placement of the dolly beneath the freight container, the dolly also includes a gin pole assembly, which is stowable in a recess so as to not interfere with placement of the container.

8 Claims, 19 Drawing Sheets

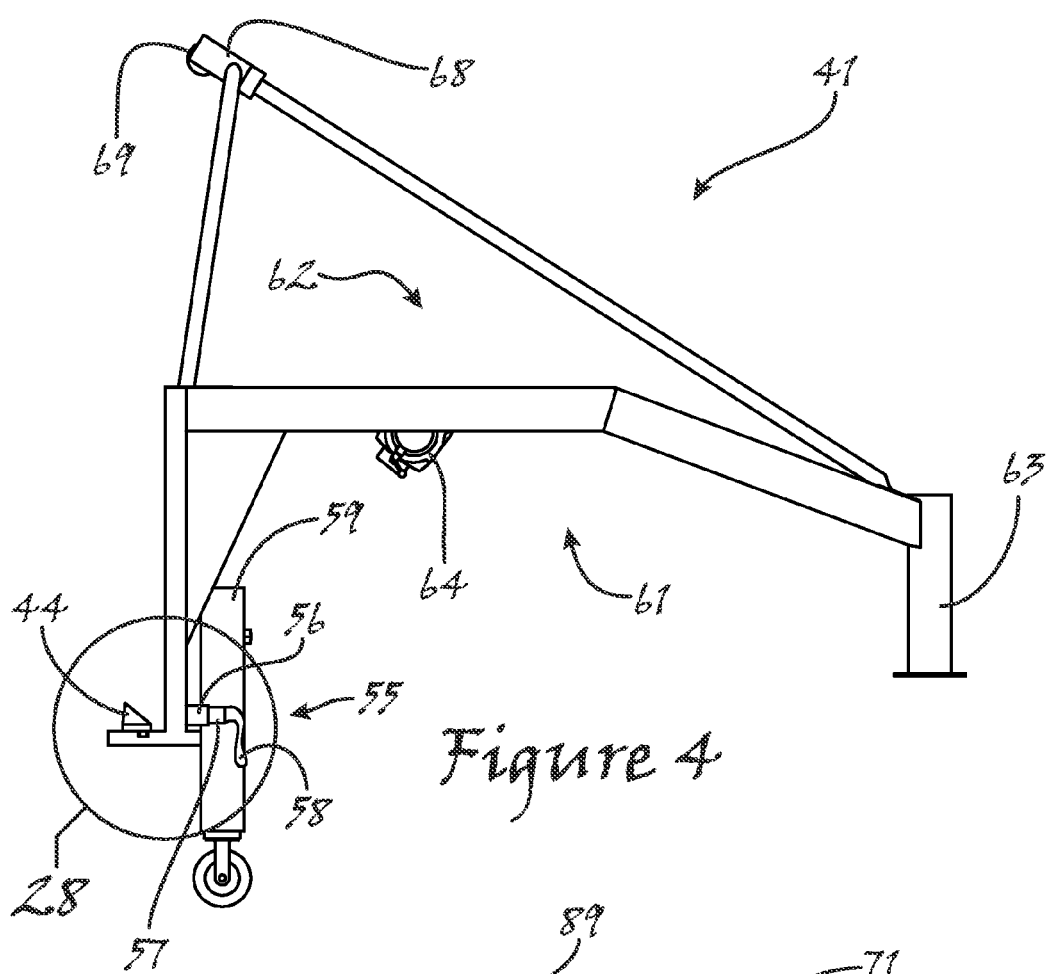
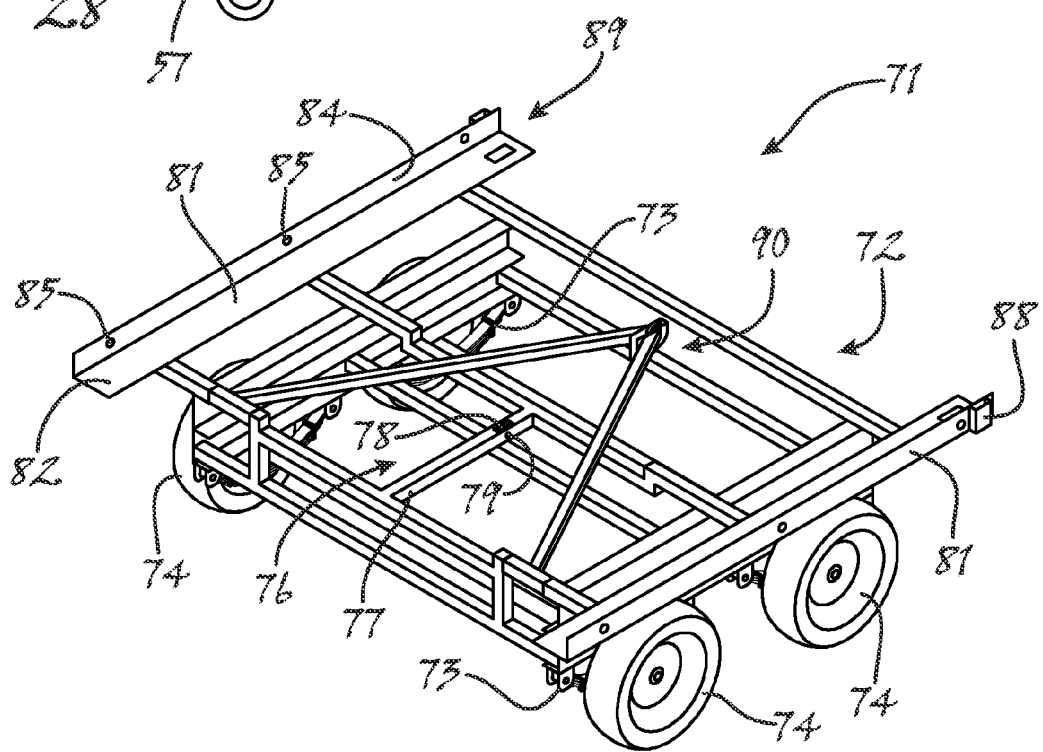

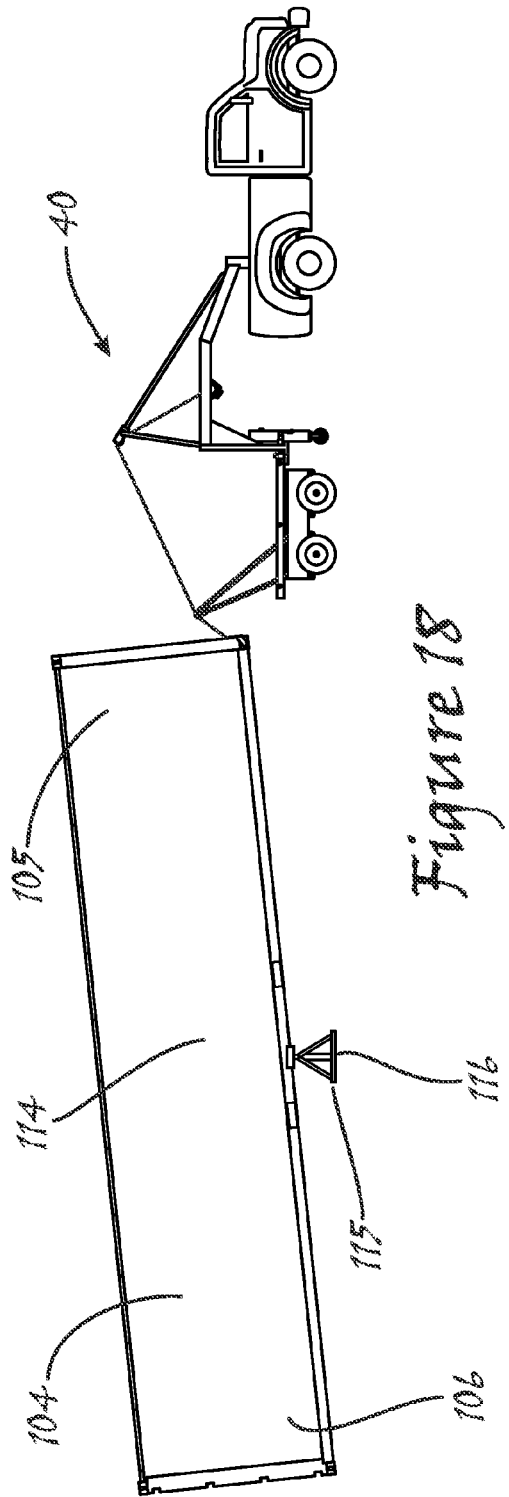
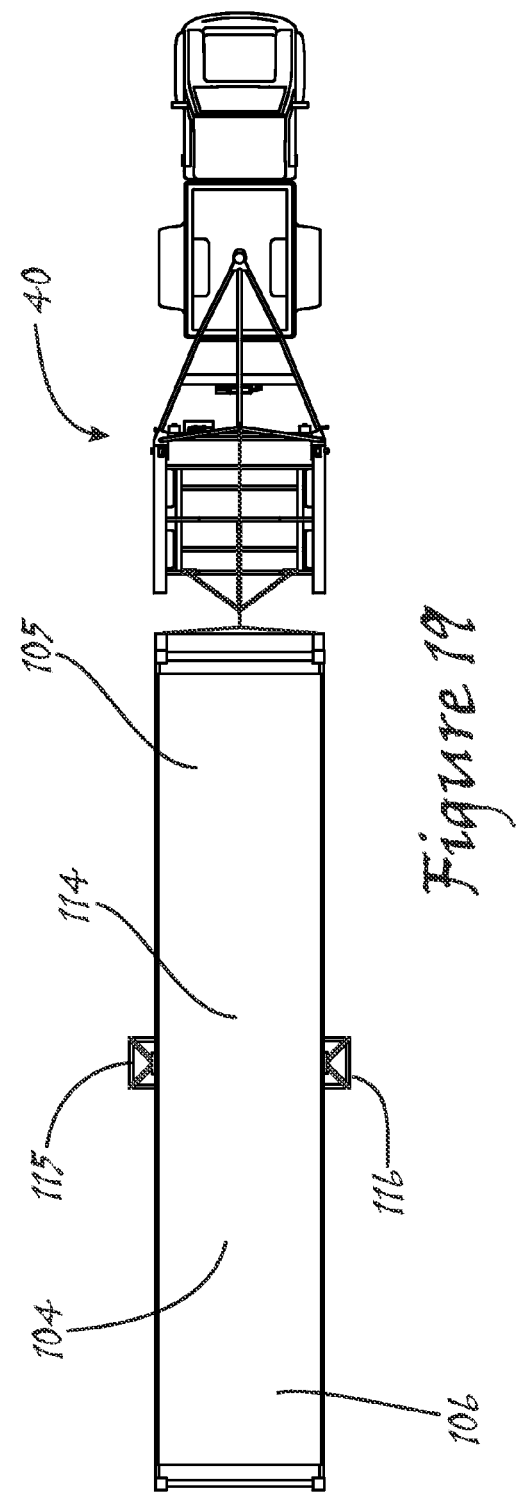

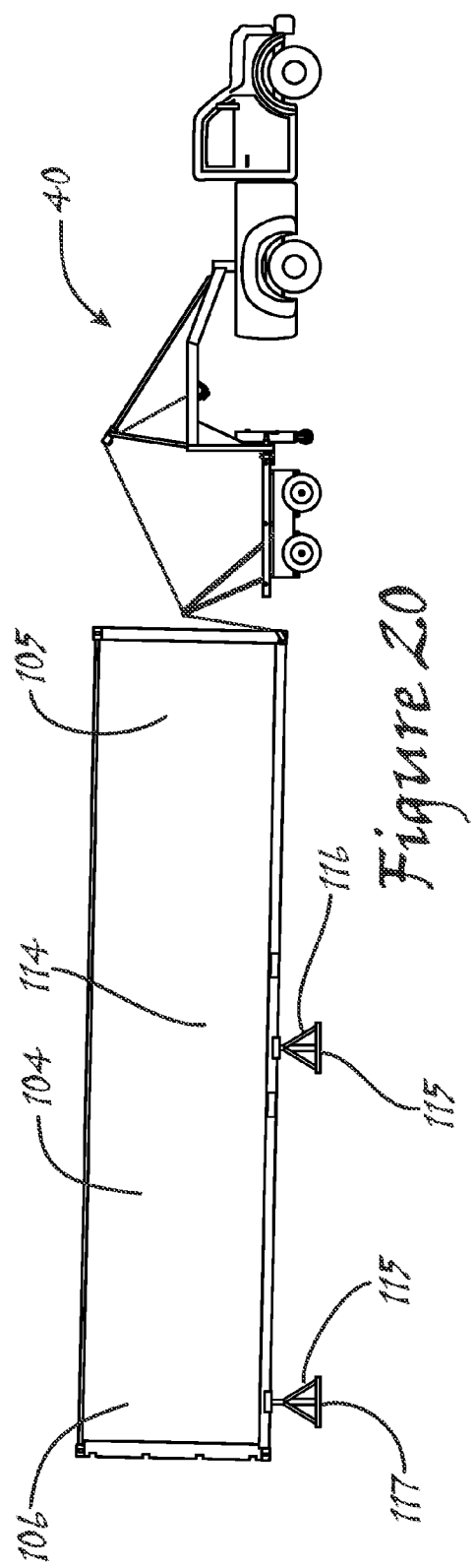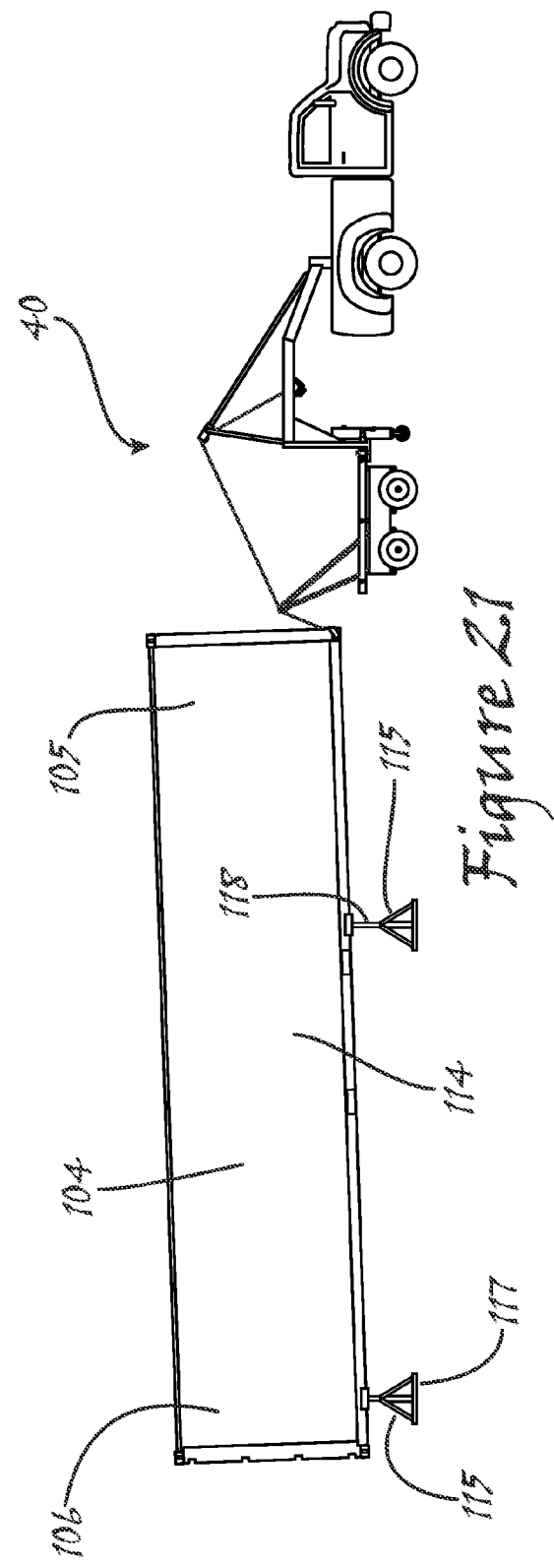

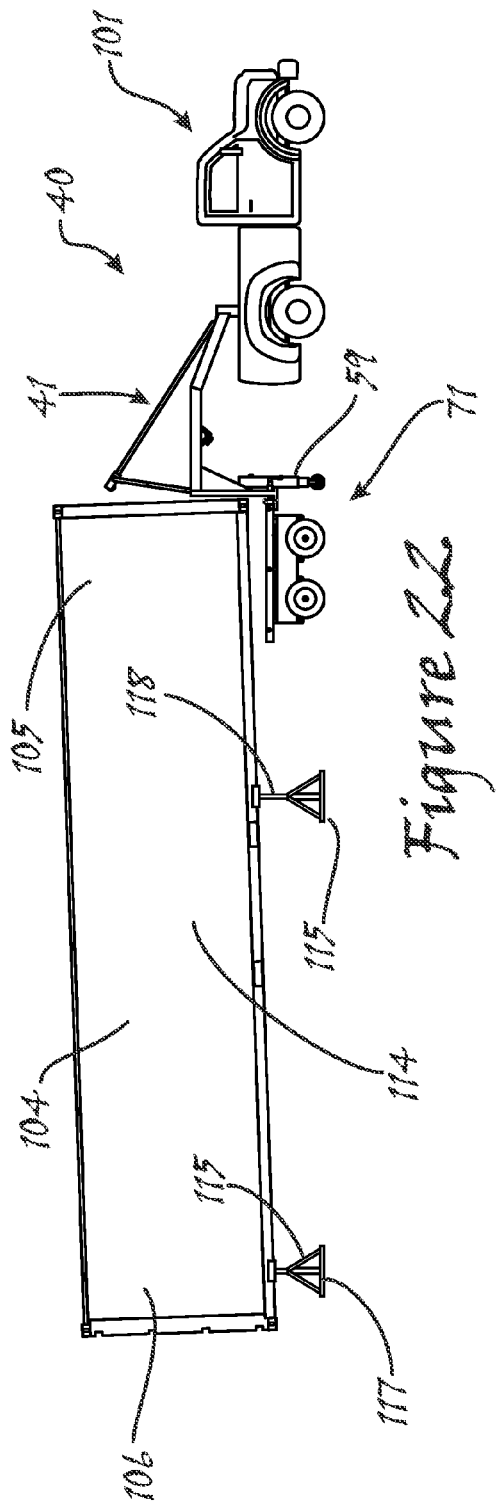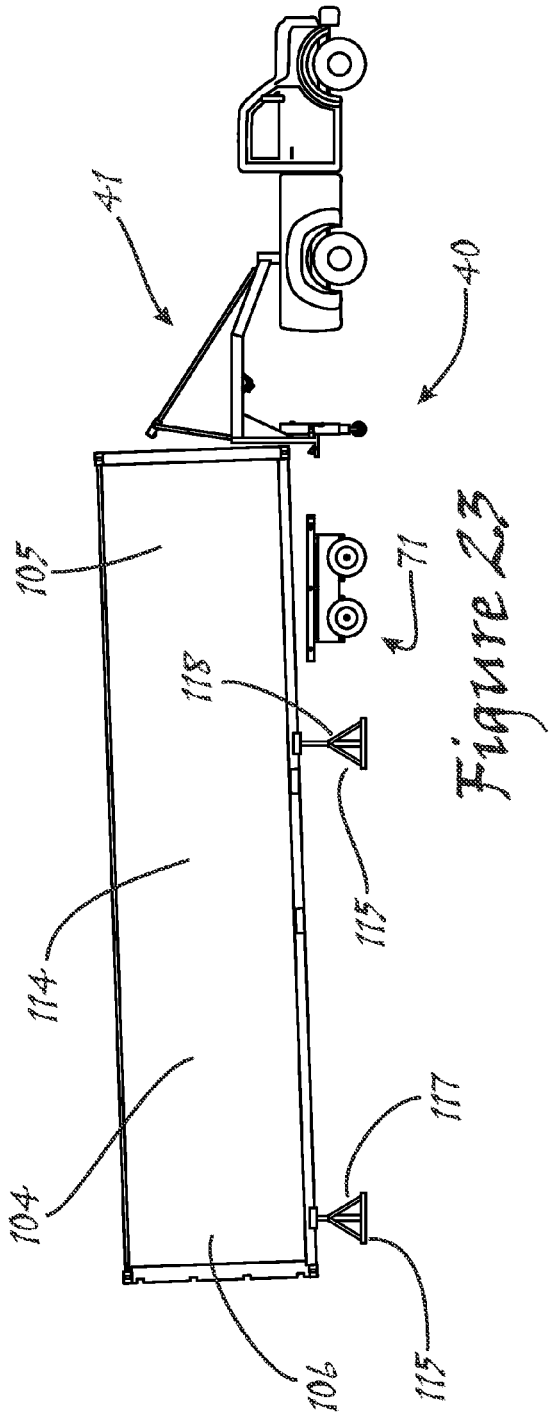

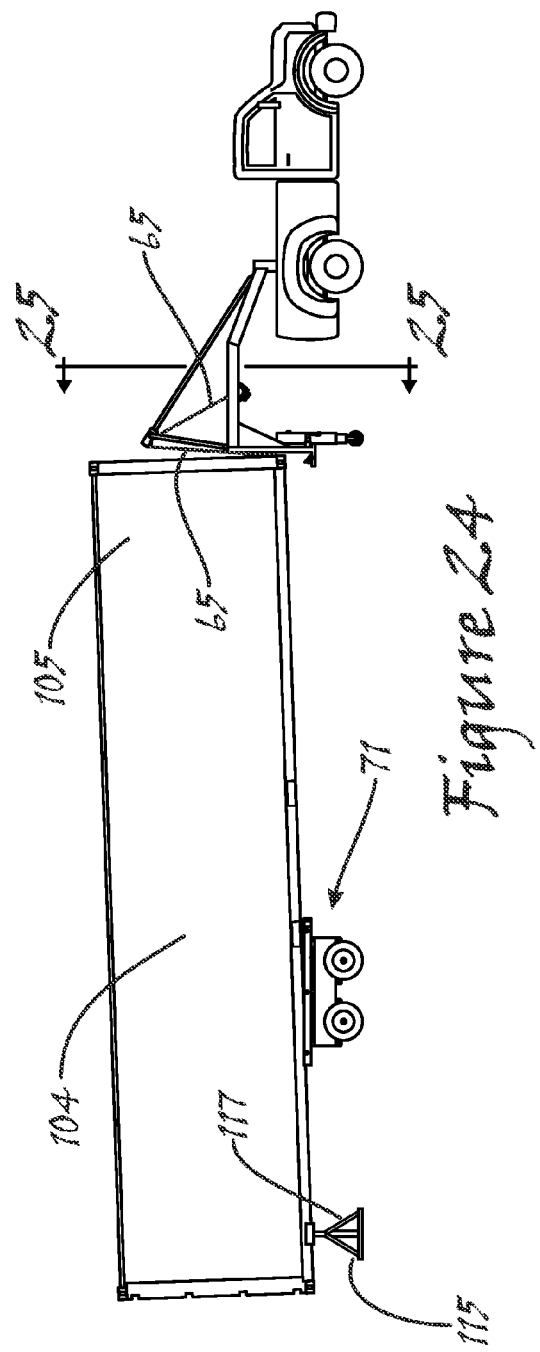
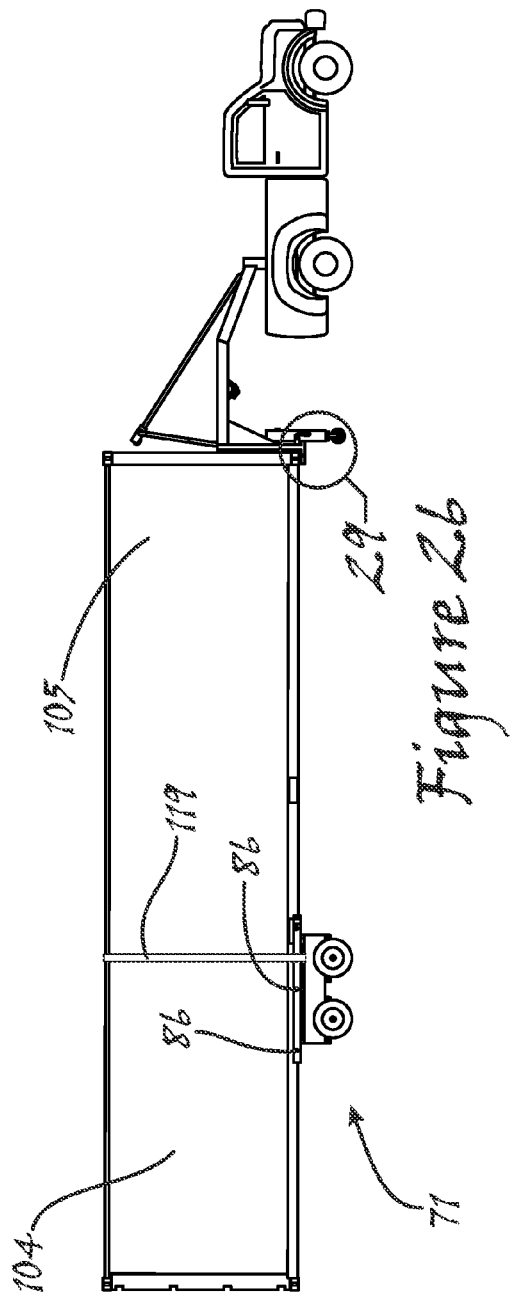

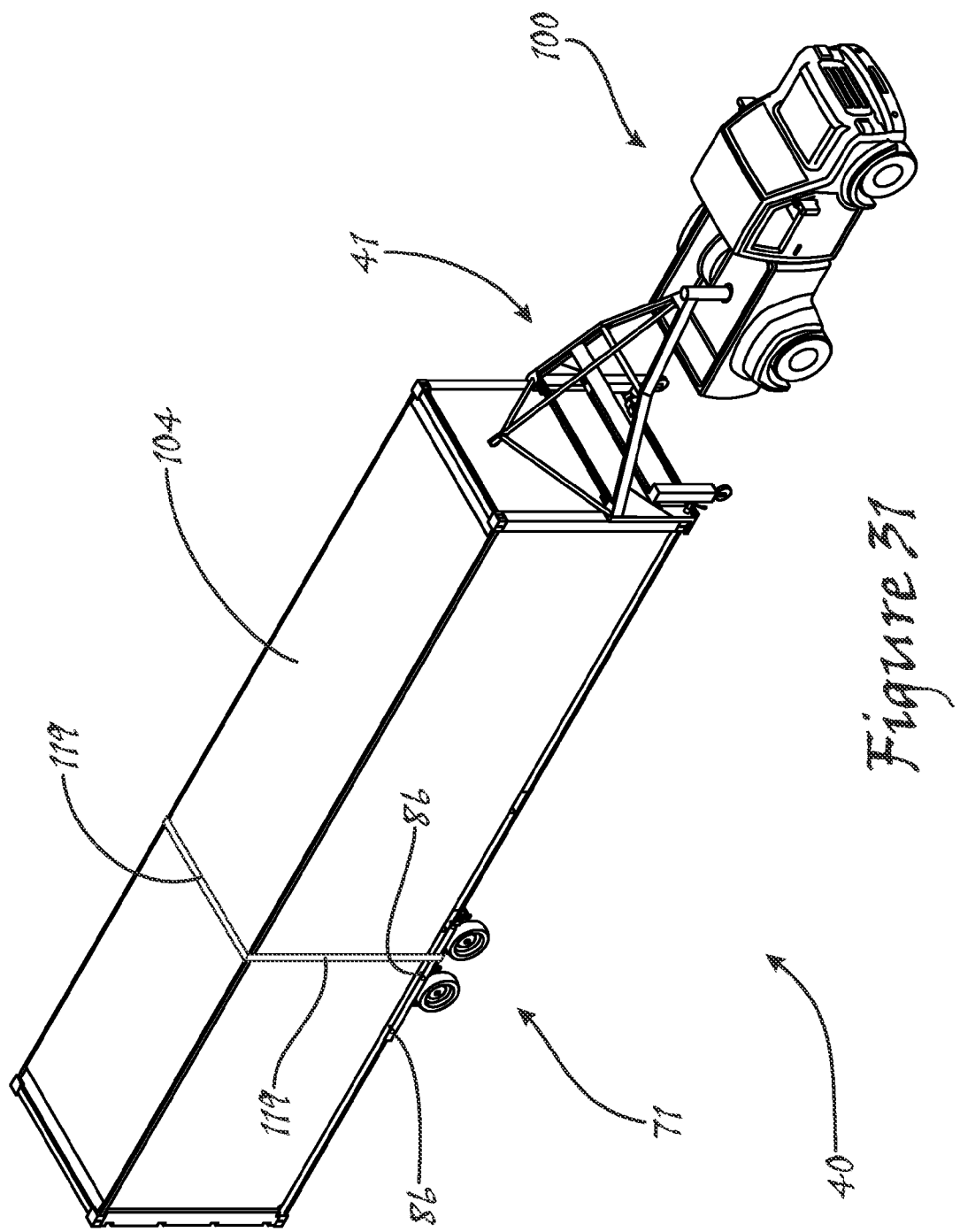

SHIPPING CONTAINER TRANSPORT SYSTEM

FIELD OF THE INVENTION

The present invention relates to transportation. More particularly, the invention relates to a transport system specifically adapted to enable efficient transportation of substantially empty intermodal freight containers.

BACKGROUND OF THE INVENTION

In addition to their primary use for the transportation of goods, intermodal freight containers are known to provide extremely secure storage structures. To be sure, a break in generally requires a blow torch or dynamite. As a downside, however, even a small intermodal freight container weighs several thousand pounds. As a result, an expensive and special use tilt bed roll off truck, a small crane or a huge forklift is generally required to move and position such containers and transportation of even empty containers is virtually limited to semi trailer type trucks aided by loading equipment at each end of the journey. Even if such trucking facilities are available, transportation of substantially empty intermodal freight containers is extremely wasteful as a result of fuel consumption alone.

With the shortcomings of the prior art clearly in mind, it is an overriding object of the present invention to improve over the prior art by providing a shipping container transport system that enables a medium duty truck to be utilized for the efficient transportation over any distance, short or long, of a substantially empty intermodal freight container. Additionally, it is an object of the present invention to provide such a shipping container transport system that also makes provision for picking up and placing containers. Still further, it is an object of the present invention to provide such a shipping container transport system that is capable of picking up and placing containers with the most limited access to the sides of the container, thereby accommodating containers that cannot be handled by forklifts.

SUMMARY OF THE INVENTION

In accordance with the foregoing objects, the present invention—a container transport system for transporting intermodal freight containers by medium duty truck—generally comprises a gooseneck assembly adapted for towing by a medium duty truck and a dolly adapted for supporting the weight of an intermodal freight container. The gooseneck assembly includes a pair of platforms each adapted to support a corner casting of the transported intermodal freight container and having a post adapted to be matingly received through a bottom orifice of the supported corner casting. A hoist assembly is provided to lift an end of the intermodal freight container for placing the container on the dolly or removing the container from the dolly. A pair of barrel slide bolt assemblies is provided for securing the intermodal freight container in place atop the platforms.

The dolly comprises a bogie type frame constructed atop a wheeled suspension system and supporting a pair of brackets adapted to engage opposite sides of the intermodal freight container. In order to facilitate placement of the dolly beneath the freight container, the dolly also includes a gin pole assembly, which is stowable in a recess formed within the bogie frame at a height less than the height of the brackets (so as to not interfere with placement atop the brackets of the container) and is cooperatively adapted with the hoist assembly of the gooseneck assembly to lift an end of said intermodal freight container (so as to essentially pass the lifted end of the container over the top of the dolly to the gooseneck assembly).

Each bracket of the dolly preferably includes an orifice adapted to releasably one of said posts of said first platform and said second platform. Additionally, each bracket of the dolly comprises a means for releasably securing the dolly to the gooseneck assembly. The hoist assembly of the gooseneck assembly preferably comprises a tripod formed in an uppermost portion of the gooseneck assembly and also preferably comprises a pulley affixed to an apex of the tripod.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein:

FIG. 4 shows, in a right side elevational view, still further details of the gooseneck assembly of FIG. 2;

FIG. 5 shows, in a perspective view, various details of the preferred implementation of the dolly of the shipping container transport system of FIG. 1;

FIG. 18 shows, in a right side elevational view, various details of the first phase of loading by the container transport system of a shipping container;

FIG. 19 show, in a top plan view, various additional details of the first phase of loading as depicted in FIG. 18;

FIG. 20 shows, in a right side elevational view, various details of the second phase of loading by the container transport system of the shipping container of FIG. 18;

FIG. 21 shows, in a right side elevational view, various details of the third phase of loading by the container transport system of the shipping container of FIG. 18;

FIG. 22 shows, in a right side elevational view, various details of the fourth phase of loading by the container transport system of the shipping container of FIG. 18;

FIG. 23 shows, in a right side elevational view, various details of the fifth phase of loading by the container transport system of the shipping container of FIG. 18;

FIG. 24 shows, in a right side elevational view, various details of the sixth phase of loading by the container transport system of the shipping container of FIG. 18;

FIG. 26 shows, in a right side elevational view, various details of the final phase of loading by the container transport system of the shipping container of FIG. 18;

FIG. 31 shows, in a perspective view, the preferred implementation of the of the shipping container transport system of the present invention as operably employed to transport an intermodal shipping container with a medium duty truck.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
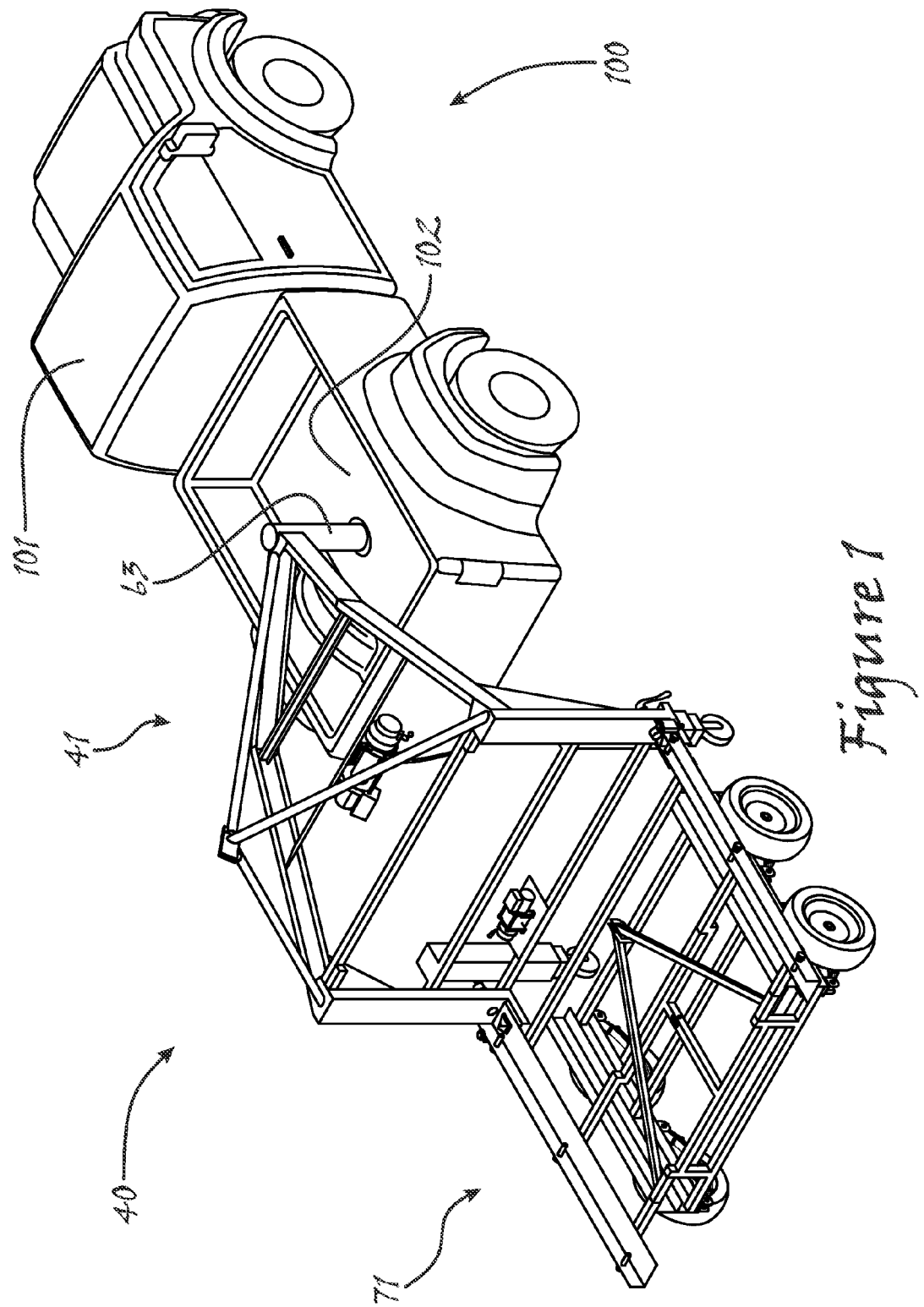
FIG. 1 shows, in perspective view, the preferred implementation of the shipping container transport system of the present invention as operably connected to a medium duty truck and as configured for transportation without a shipping container.
Figure 2:
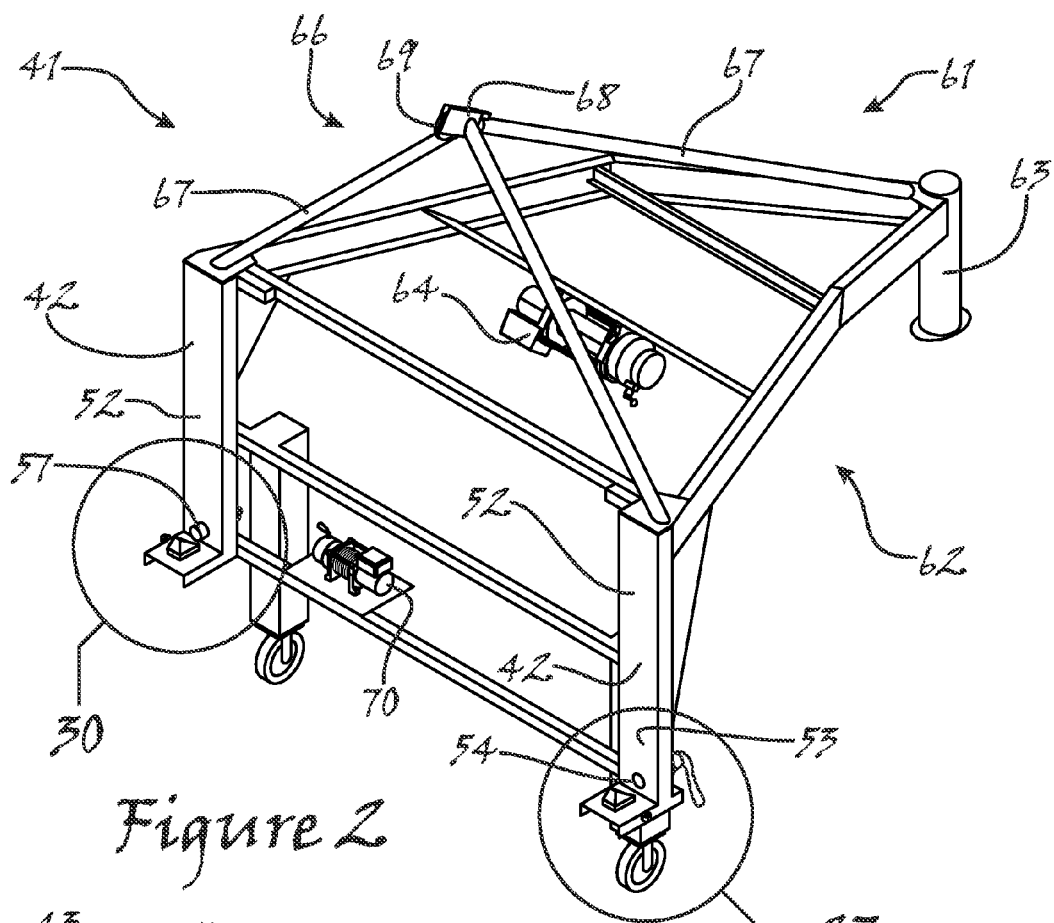
FIG. 2 shows, is a perspective view, various details of the preferred implementation of the gooseneck assembly of the shipping container transport system of FIG. 1.
Figure 3:
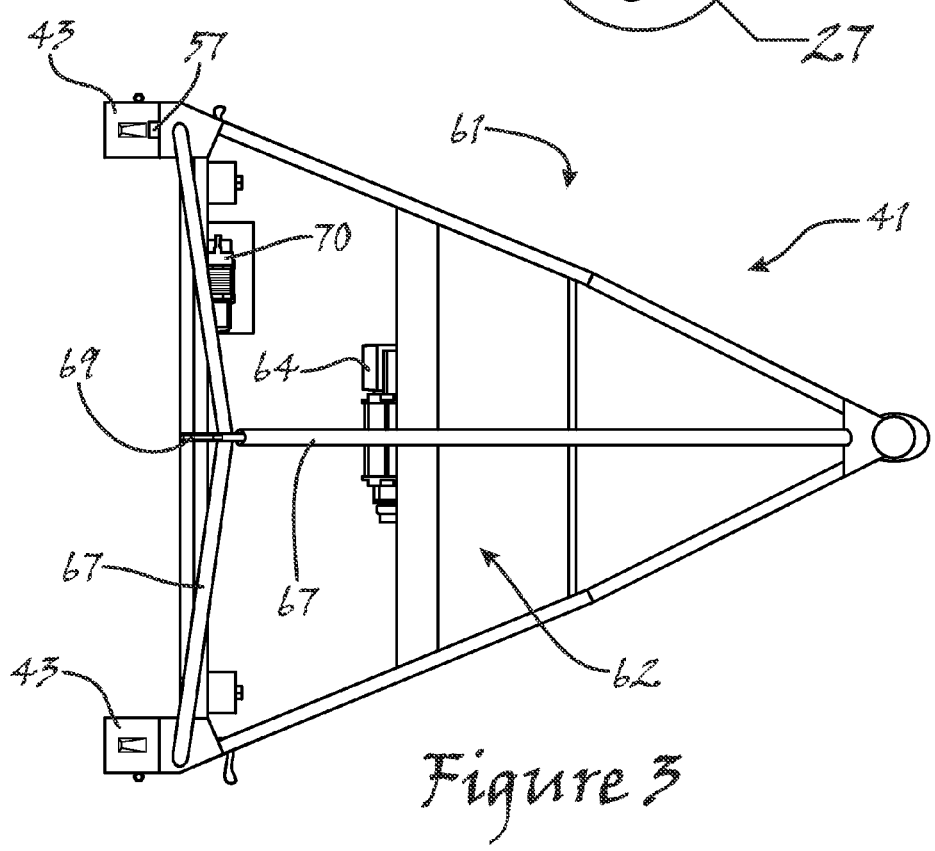
FIG. 3 shows, in a top plan view, various additional details of the gooseneck assembly of FIG. 2.

Referring now to the figures, and to FIG. 1 in particular, the shipping container transport system 40 of the present invention is shown to generally comprise a gooseneck assembly 41 adapted for towing by a medium duty truck 101, or substantially similar towing vehicle 100, and a dolly 71 adapted for supporting the weight of an intermodal freight type shipping container 104. As particularly shown in FIGS. 2 through 4, the gooseneck assembly 41 comprises a pair of brackets 42 for supporting the front end 105 (defined as used herein to mean only that end of the shipping container 104 located adjacent to the towing vehicle 100) of the shipping container 104, as will be better understood further herein.

Figure 27:
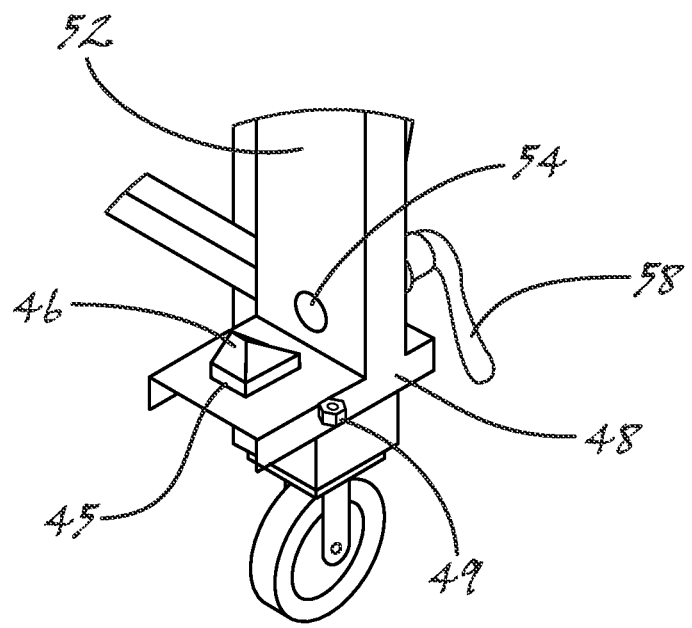
FIG. 27 shows, in a detail view located at reference element 27 in FIG. 2, various details of the means provided in the present invention for securing an intermodal shipping container to the gooseneck assembly.
Figure 28:
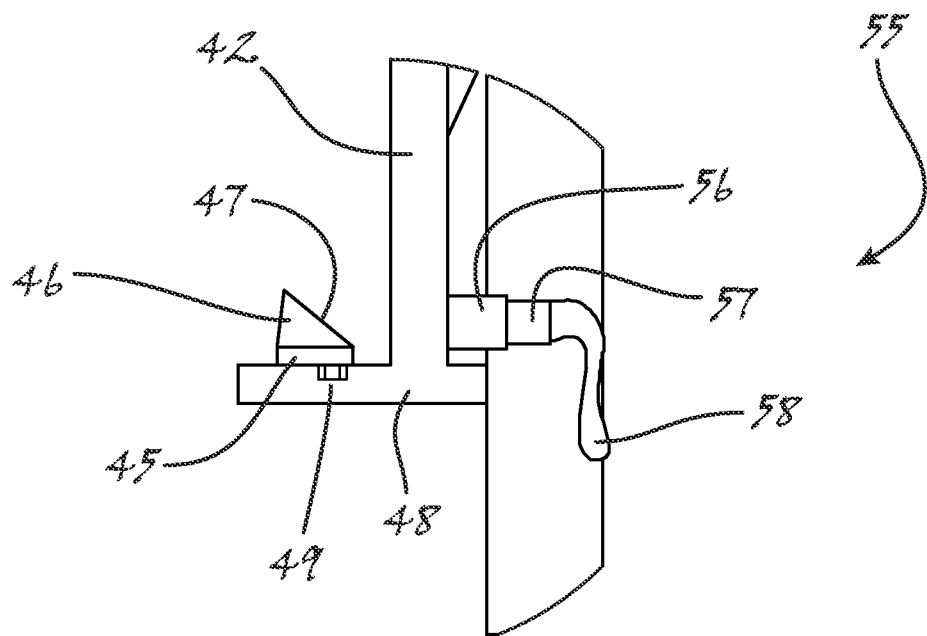
FIG. 28 shows, in a detail view located at reference element 28 in FIG. 4, various additional details of the means provided in the present invention for securing an intermodal shipping container to the gooseneck assembly.
Figure 29:
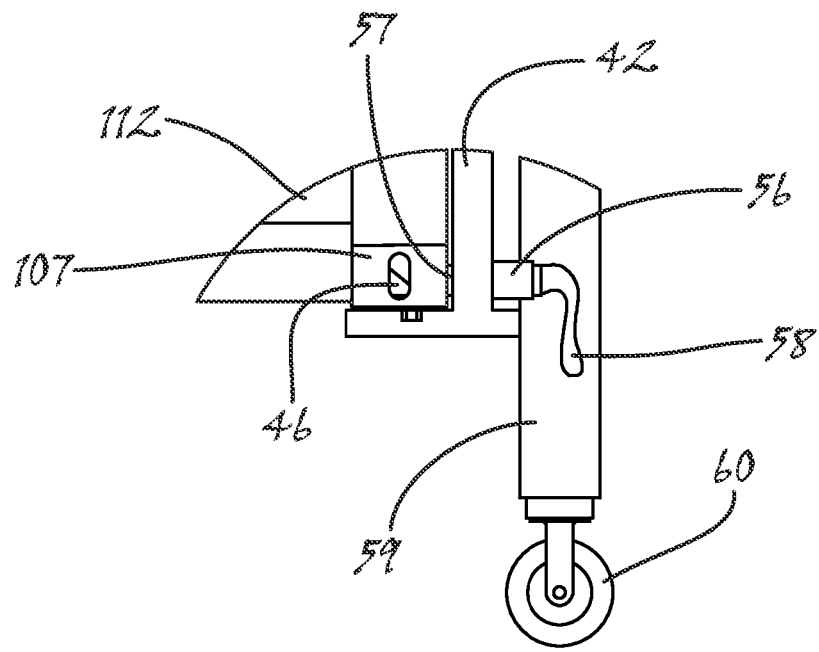
FIG. 29 shows, in a detail view located at reference element 29 in FIG. 26, still further details of the means provided in the present invention for securing an intermodal shipping container to the gooseneck assembly.

As shown in the figures, each provided bracket 42 comprises a platform 43 adapted to support a corner casting 107 of the transported intermodal freight container 104 and, to that end, having a post 44 adapted to be matingly received through the generally oval orifice 111 through the bottom surface 110 of the supported corner casting 107. As will also be better understood further herein, each post 44 preferably comprises a base 45 shaped in close conformance to the shape of a standard oval orifice 111 through the bottom surface 110 of the supported corner casting 107 and a pillar 46 formed atop the base 46 and having a preferably forward slanted top surface 47, as best shown in FIGS. 4, 27 and 28. Additionally, each provided bracket 42 also comprises a backstop 52 against which the front end 105 of a supported container 104 rests while secured to the gooseneck assembly 41, as will be described in greater detail further herein.

Figure 8:
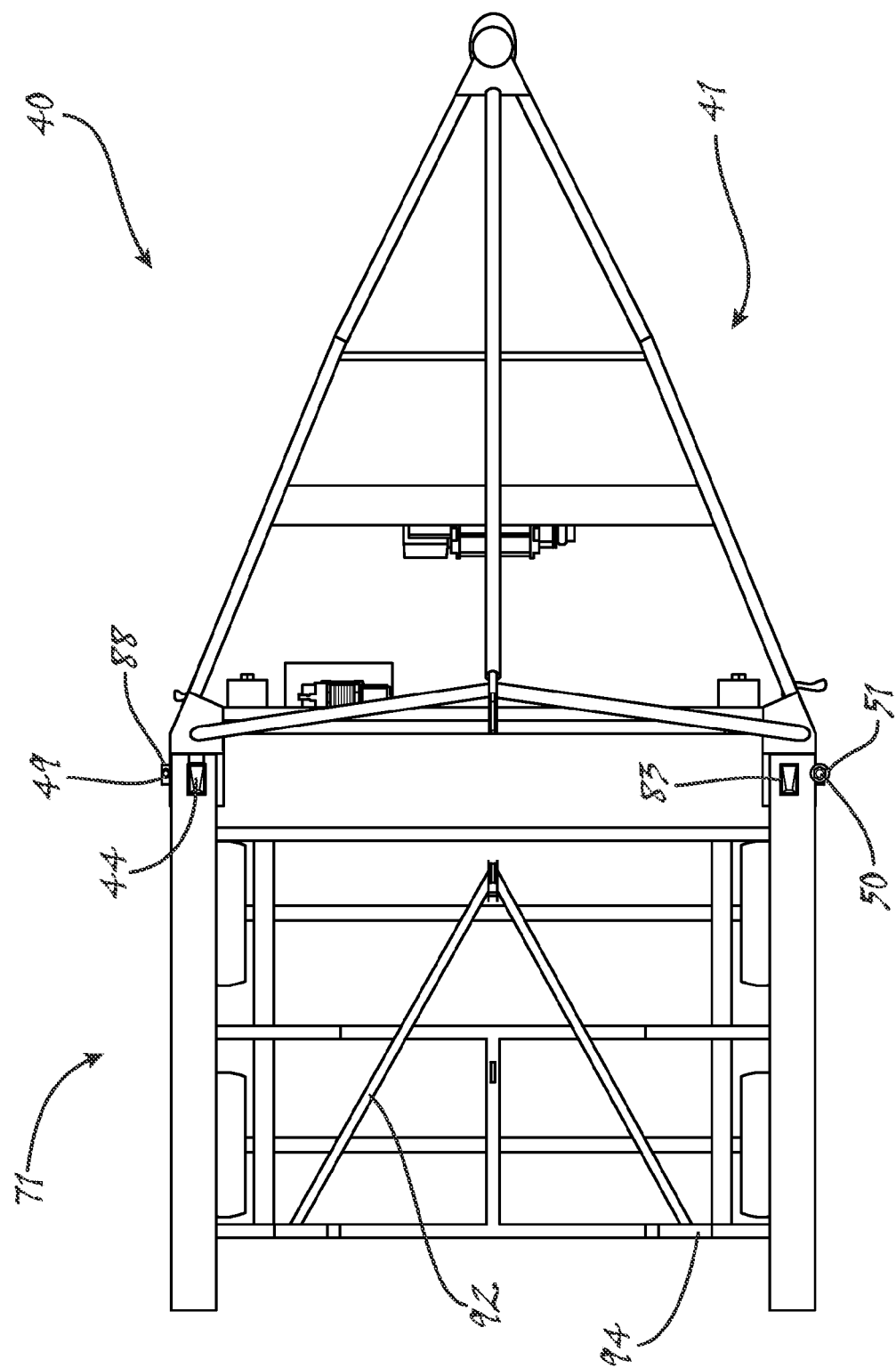
FIG. 8 shows, in a top plan view, various details of the interconnection of the gooseneck assembly of FIG. 2 with the dolly of FIG. 5 to obtain the shipping container transport system configured for transportation without a shipping container as depicted in FIG. 1.
Figure 9:
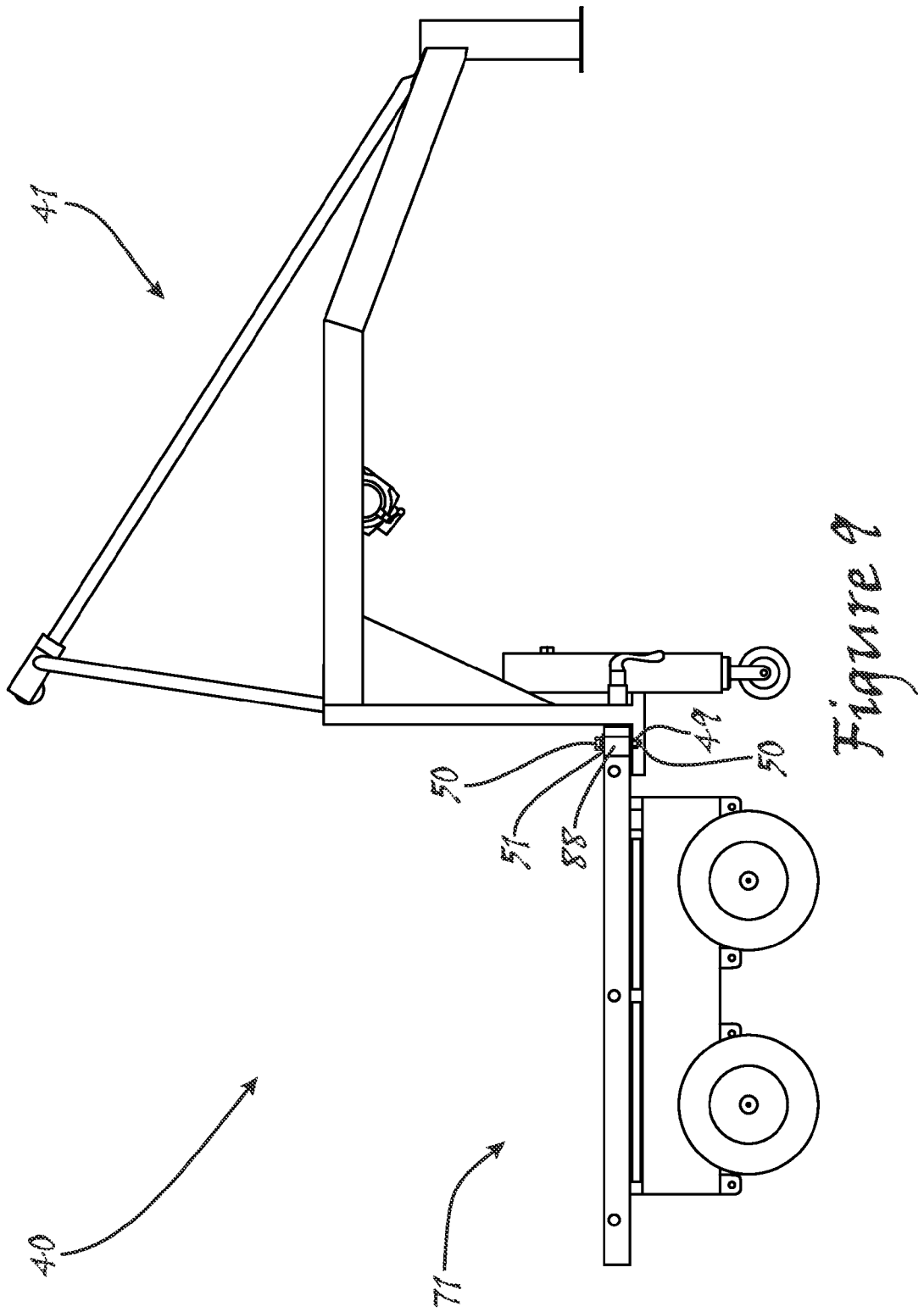
FIG. 9 shows, in a right side elevational view, various additional details of the assemblage of FIG. 8.
Figure 30:
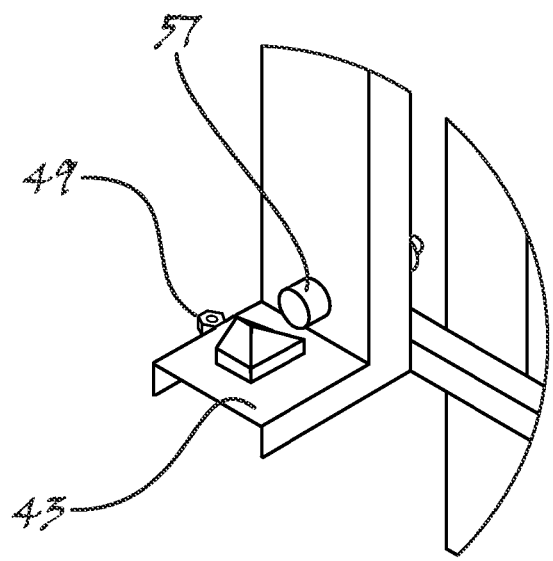
FIG. 30 shows, in a detail view located at reference element 30 in FIG. 2, yet further details of the means provided in the present invention for securing an intermodal shipping container to the gooseneck assembly.

In order to selectively secure the dolly 71 to the gooseneck assembly 41, a threaded aperture 49, which may simply comprise an appropriately sized conventional nut, is provided adjacent the outside edge 48 of each platform 43, as particularly shown in FIGS. 8 and 9. In order to provide a means for securing a supported intermodal freight container 104 in place atop the platforms 43, a barrel slide bolt assembly 55 (or other substantially equivalent means) is implemented at the lower portion 53 of each backstop 52. As will be better understood further herein, operation of the handle 58 affixed to a bolt 57 serves to send the bolt 57 through the barrel 56 and orifice 54 (as shown in the detail of FIG. 30) or, in opposite fashion, to withdraw the bolt 57 (as shown in the detail of FIG. 27).

As will be necessary at various stages of operation of the shipping container transport system 40 of the present invention, the gooseneck assembly 41 of the present invention must on occasion support itself without the aid of the attached dolly 71. To this end, the gooseneck assembly 41 comprises a pair of preferably heavy duty jacks 59 affixed adjacent each of the brackets 42. As shown in the figures, the heavy duty jacks 59 may comprise wheels 60 for facilitating any necessary repositioning during operation of the present invention or, in the alternative, may simply comprise conventional footplates or the like.

Finally, the gooseneck assembly 41 comprises a gooseneck 61 in the proper sense, which itself comprises a structural frame 62 supporting a coupler assembly 63 (for engaging a ball in the bed 102 of the medium duty truck 101) and a winch 64 for use in connection with an implemented elevated hoist assembly 66. As shown in the figures, the elevated hoist assembly 66 preferably comprises a tripod 67 constructed of tubular frame members and having, at its apex 68, a pulley 69. Although not critical to the present invention, the structural frame 62 may optionally comprise a supplemental winch 70, such as may be convenient for relocating the dolly 70 in muddy or like conditions.

Figure 6:
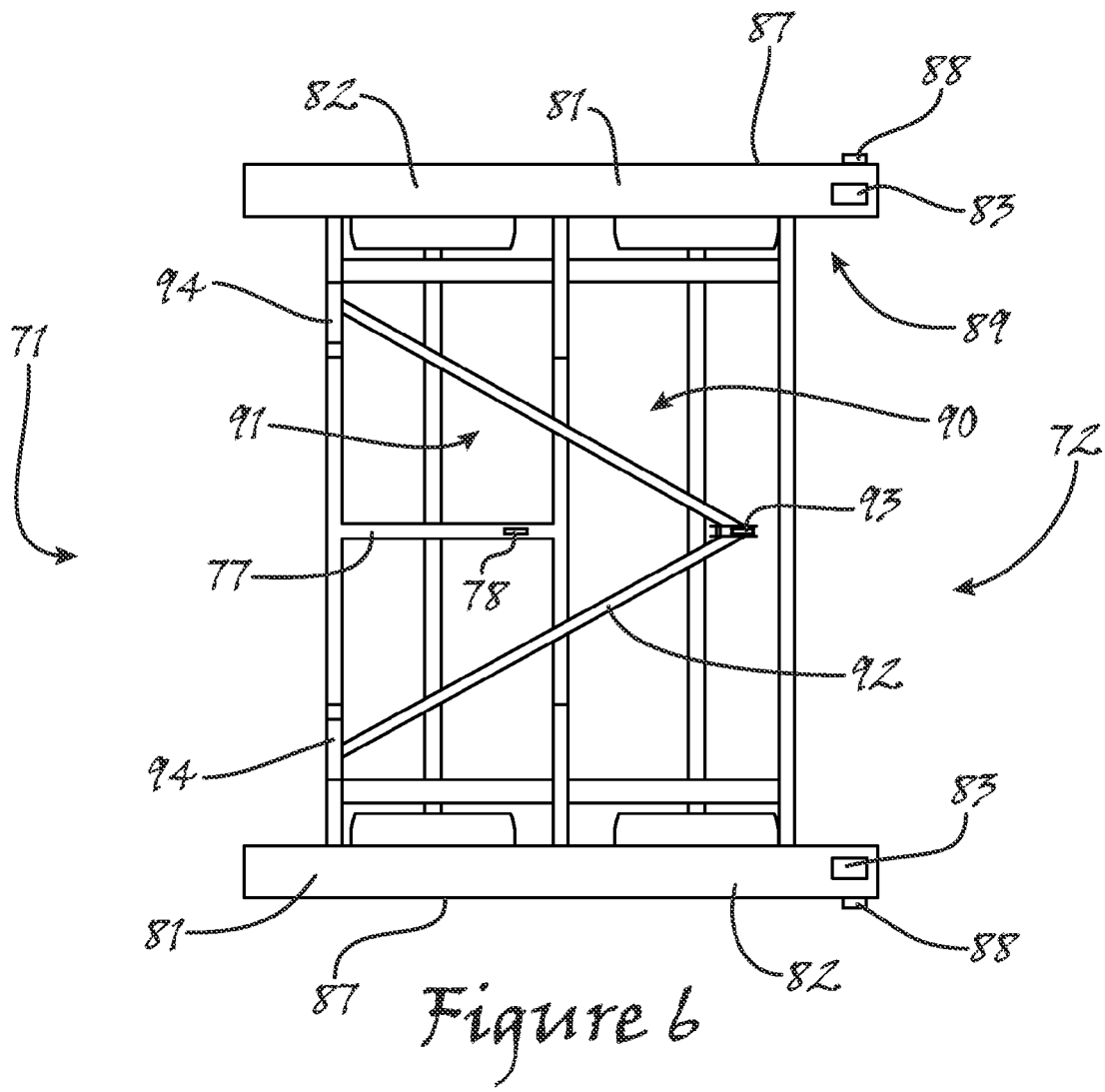
FIG. 6 shows, in a top plan view, various additional details of the dolly of FIG. 5.
Figure 7:
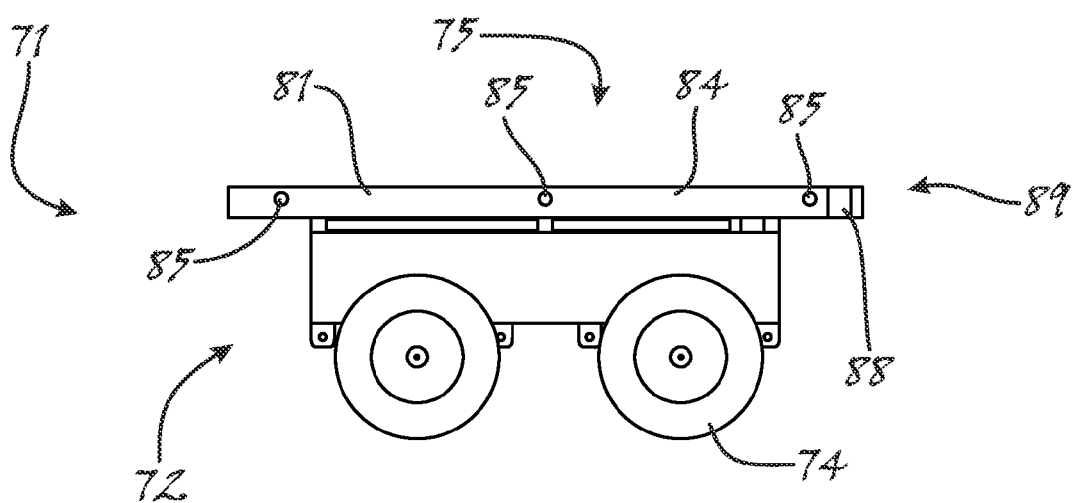
FIG. 7 shows, in a right side elevational view, still further details of the dolly of FIG. 5.

As particularly shown in FIGS. 5 through 7, the dolly 71 generally comprises a bogie type frame 72 constructed atop a generally conventional suspension system 73 and attaching a plurality of wheels 74 to the dolly 71. Additionally, the bogie frame 72 supports a pair of preferably L-shaped brackets 81 adapted to engage opposite sides 112 of the intermodal freight container 104. To this end, each container bracket 81 preferably comprises an elongate horizontal platform 82 and corresponding side panel 84.

In order to facilitate selective securement of the dolly 71 to the gooseneck assembly 41, each elongate platform 82 is adjacent the front 89 of the bracket provided with an aperture 83 that is sized, shaped and otherwise adapted to receive therethrough a post 44 of the platforms 43 of the gooseneck assembly 41. Additionally, a vertically oriented channel 88 is provided adjacent the front 89 of the bracket on the outside surface 87 of each side panel 84. As particularly shown in FIGS. 8 and 9, a bolt 50 (with, if necessary or desired, a washer 51) is readily inserted through the provided channel 88 to engage the corresponding threaded aperture 49 provided in connection with the gooseneck assembly 41, thereby in cooperation with the interface between the apertures 83 and posts 44 providing secure attachment of the dolly 71 to the gooseneck assembly 41.

As will be better understood further herein, the dolly 71 requires a lifting capability at certain phases of operation only. As a result, the dolly 71 also includes a gin pole assembly 90, which is stowable in a recess 76 formed within the top portion 75 of the bogie frame 73 at a height less than the height of the brackets 81 (so as to not interfere with placement atop the brackets 81 of the container 104) and is cooperatively adapted with the hoist assembly 66 of the gooseneck assembly 41 to lift an end 105 of the intermodal freight container 104 (so as to essentially pass the lifted end 105 of the container 104 over the top of the dolly 71 to the gooseneck assembly 41). To this end, a pivotally affixed frame 91, which preferably comprises an inverted V-shaped weldment 92 with an integral pulley 93, is attached through provided hinges 94 to the bogie frame 72. In order to deploy the gin pole assembly 90 for use, as particularly shown in FIGS. 10 and 12, a support bar 95, comprising a tubular member 96 with a tongue 98 and pinhole 99 at each end 97, is provided. As shown in figures, the deployed gin pole assembly 90 is temporarily affixed in operable position by inserting the tongues 98 in slots 78 provided in the frame members 77 and securing the support bar 95 with conventional pins 80 through pinholes 79 in the slots 78 and the pinholes 99 of the tongues 98.

Figure 10:
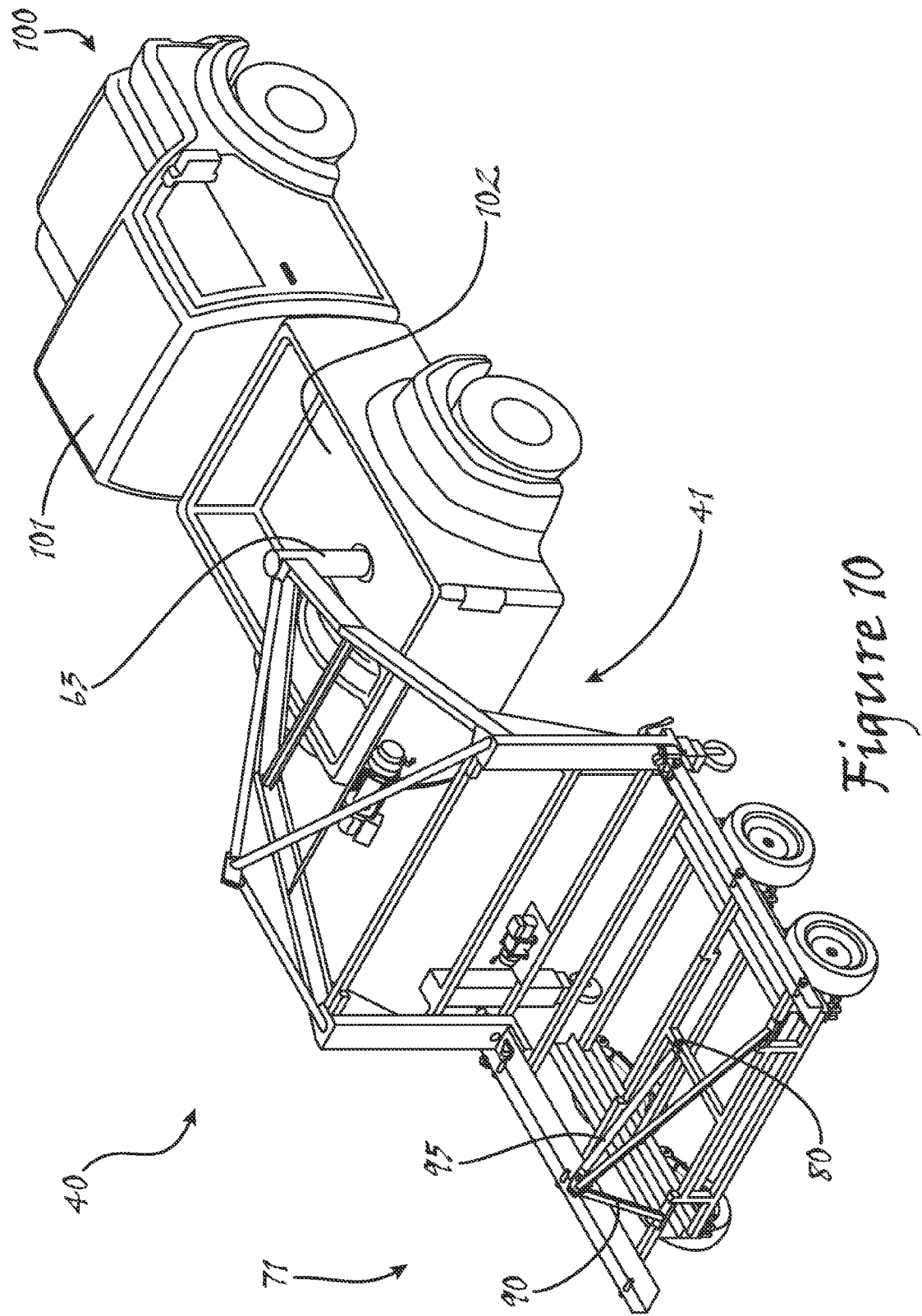
FIG. 10, shows, in a perspective view generally corresponding to that of FIG. 1, the shipping container transport system as configured in preparation for the handling of a shipping container.
Figure 11:
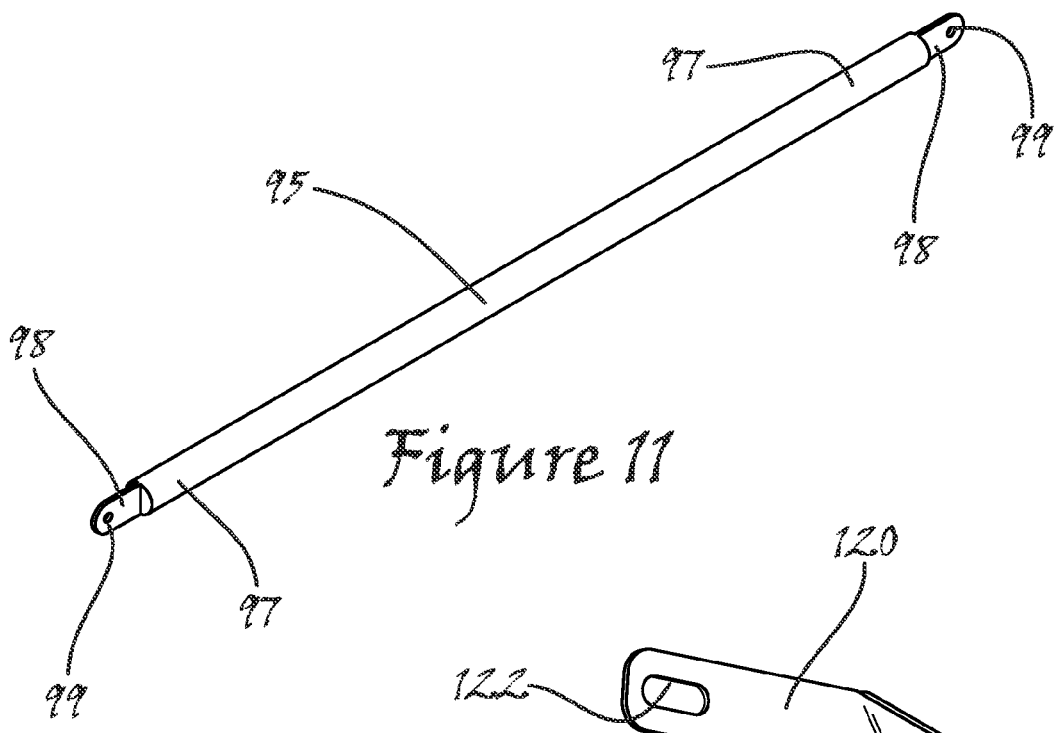
FIG. 11 shows, in a perspective view, various details of a support bar as utilized in the preparation of FIG. 10.
Figure 14:
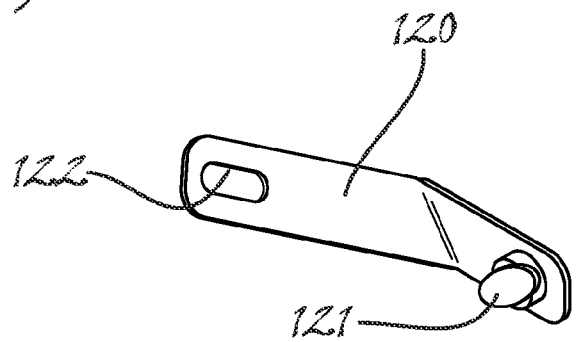
FIG. 14 shows, in a first perspective view, various details of a corner bracket such as may be used to facilitate connecting a winch cable to an intermodal freight shipping container.
Figure 15:
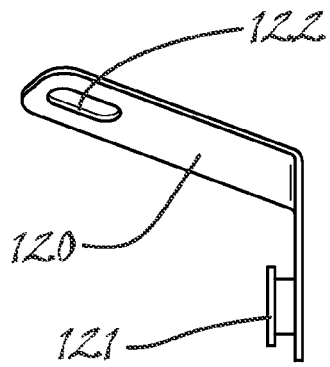
FIG. 15 shows, in a second perspective view, various additional details of the corner bracket of FIG. 14.
Figure 16:
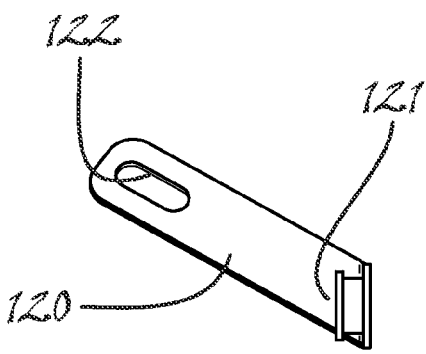
FIG. 16 shows, in a third perspective view, still further details of the corner bracket of FIG. 14.
Figure 12:
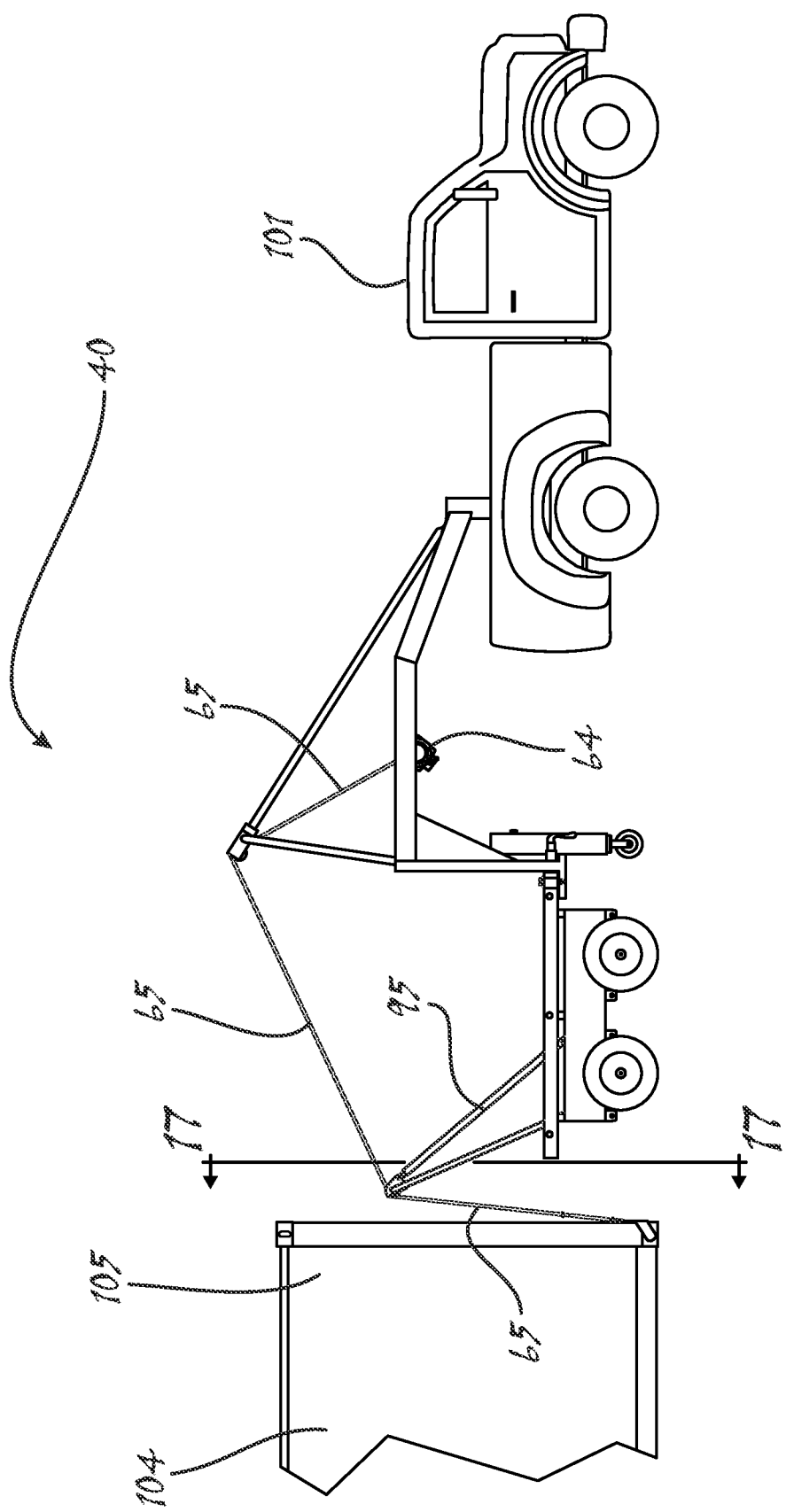
FIG. 12 shows, in a right side elevational view, the shipping container transport system of the present invention as positioned in place by a medium duty truck for commencement of the loading of an intermodal freight shipping container.
Figure 13:
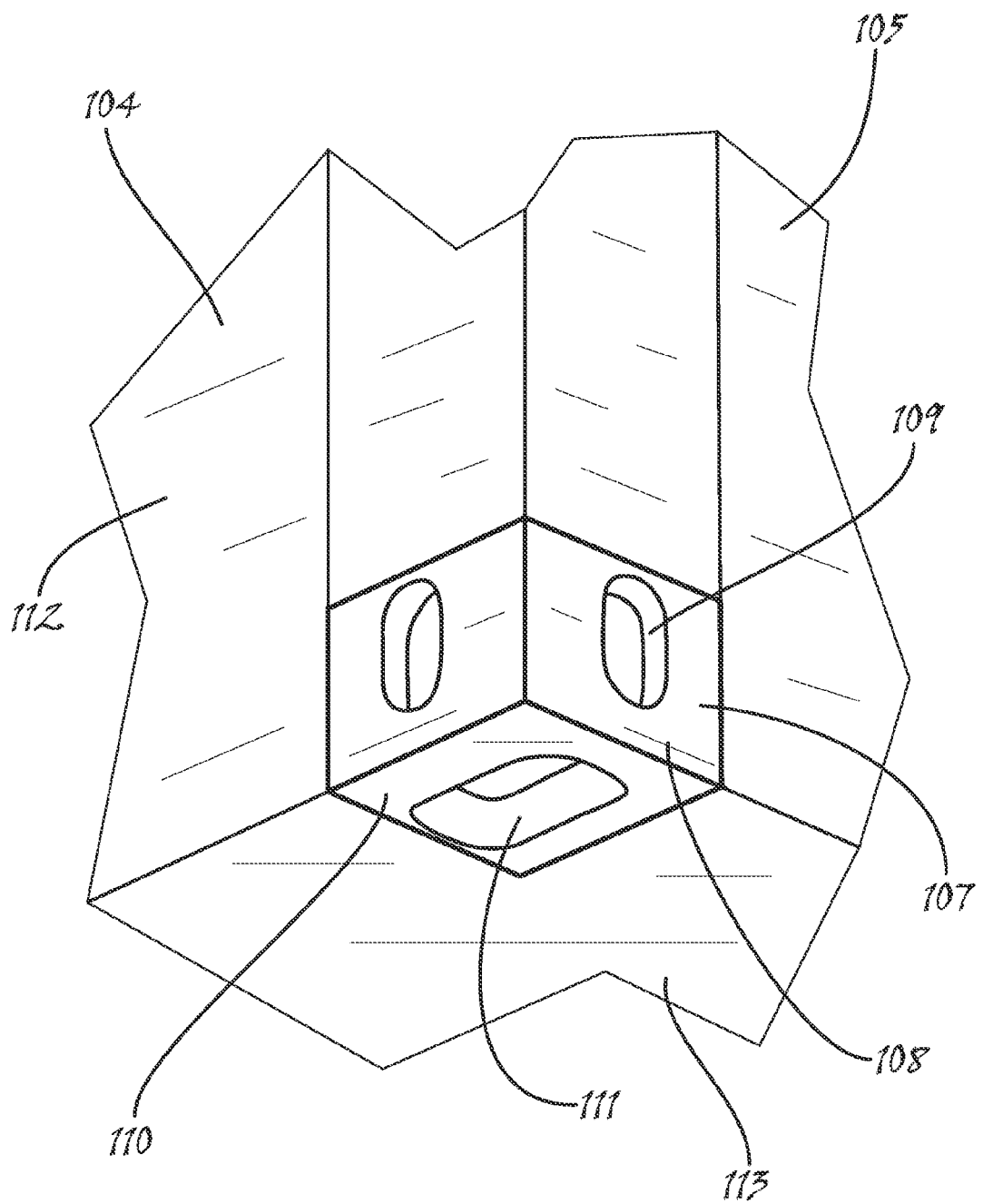
FIG. 13 shows, in a perspective view, various details of a typical right front corner casting of an intermodal freight shipping container.
Figure 17:
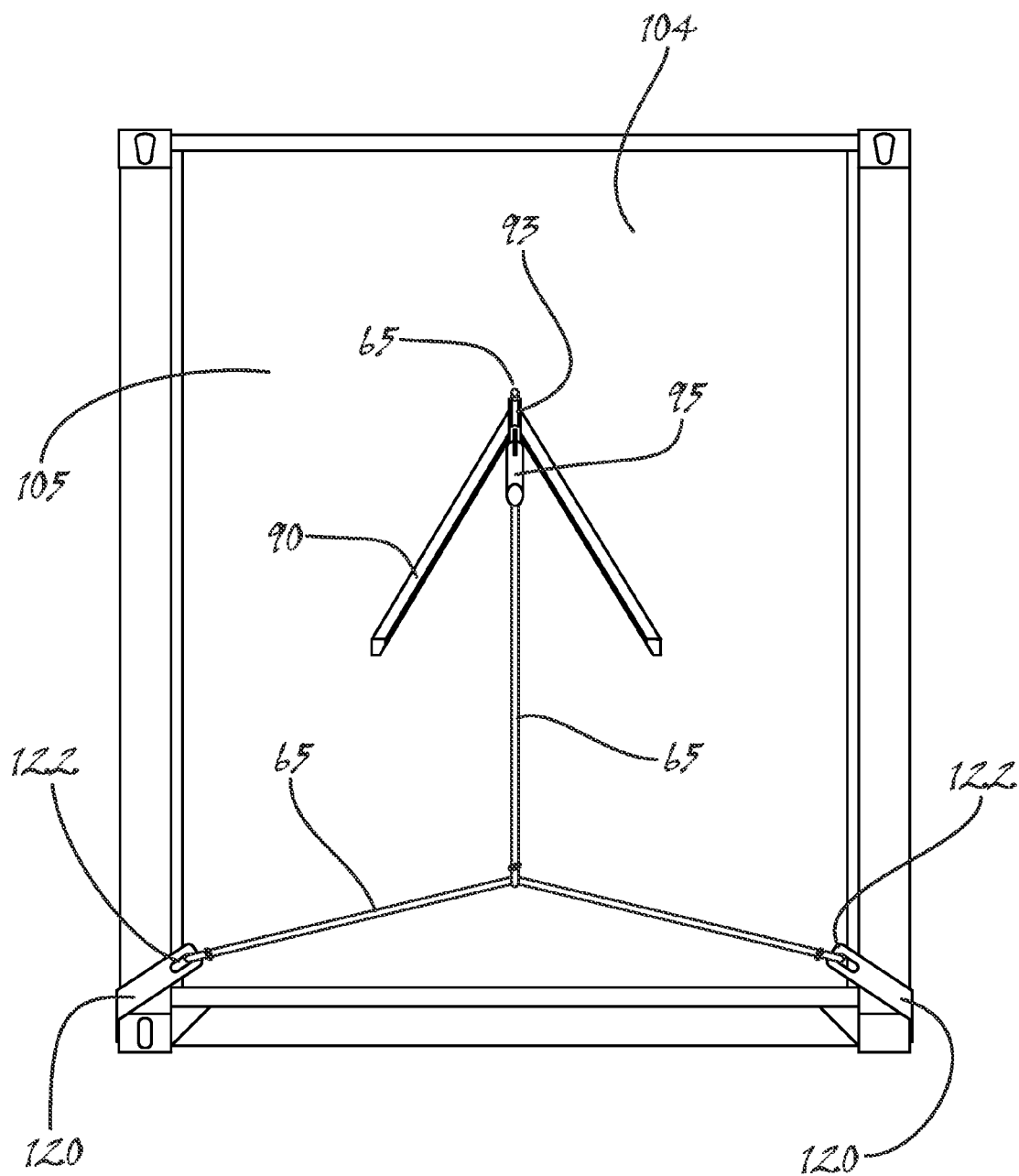
FIG. 17 shows, in a cross-sectional view taken through cut line 17-17 of FIG. 12, various details of the interconnection of an intermodal freight shipping container to the hoist system of the shipping container transport system of the present invention and, in particular, various details of use of a provided gin pole assembly.

Referring now to FIG. 12, the first phase of deployment starts with the positioning of the shipping container transport system 40, configured as shown in FIG. 10, as shown in FIG. 15. With the shipping container transport system 40 positioned as shown, the front end 105 of the container 104 is affixed to the winch cable 65 as routed in the depictions of FIGS. 12 and 17. To this end, it is noted that corner brackets 120, having both corner casting engagement members 121 and hoist cable interfaces 122 as depicted in FIGS. 14 through 16, may be helpful, especially if no other purchase is readily available due to the positioning of the container 104 on the ground or a like surface. In any case, the winch 64, hoist assembly 66 and gin pole assembly 90 is then used to lift the front end 105 of the container 104 such that jack stands 115 in short configurations 116 may be positioned as shown in FIGS. 18 and 19 to the rear of the center of mass 114 of the container 104.

In the next step, the front end 105 of the container 104 is allowed pivot downward about the short stands 116, as shown in FIG. 20, thereby allowing jack stands 115 in medium height configuration 117 to be placed adjacent the rear end 106 (defined as used herein to mean only that end of the shipping container 104 located opposite the defined front end 105) as shown in FIG. 20. With the medium stands 117 so placed, the front end 105 of the container 104 is again raised, as shown in FIG. 21, such that the initially placed short stands 115 may be removed and replaced by jack stands 115 in tall configurations 118, but in this case located forward of the center of mass 114 of the container 104.

With the container 104 now fully supported atop the medium and tall jack stands 117 and 118, respectively, the winch cable 65 may be disconnected and the shipping container transport system 40 repositioned as depicted in FIG. 22. As shown in FIG. 23, the jacks 59 are then lowered to support the gooseneck assembly 41 and the dolly 71 is detached by removing the bolts 50 and lifting the front ends 89 of the container brackets 81 off of the posts 44. Once removed, the dolly 71 is then located beneath the front end 105 of the container 104 as shown.

Figure 25:
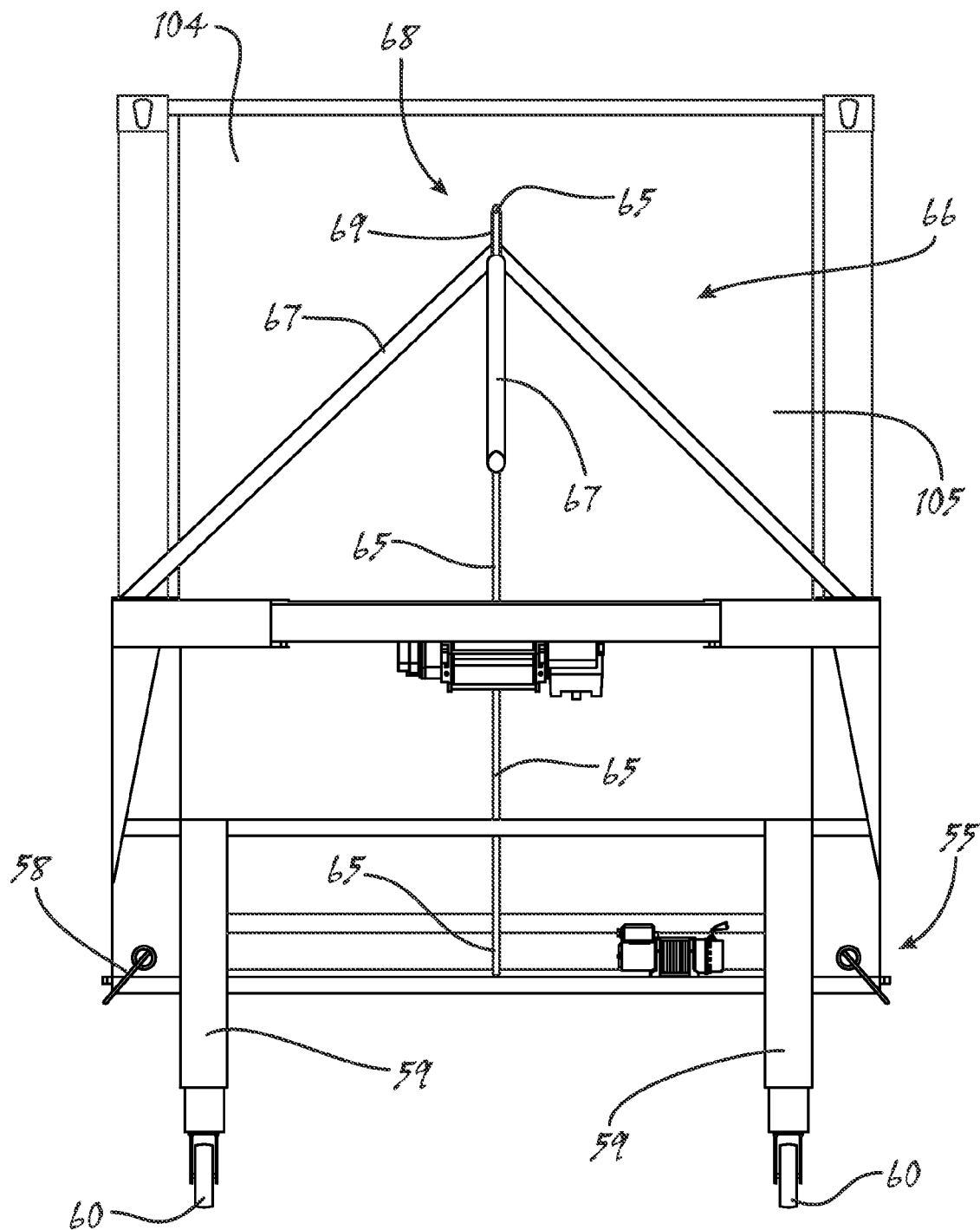
FIG. 25 shows, in a cross-sectional view taken through cut line 25-25 of FIG. 24, various additional details of the interconnection of the shipping container of FIG. 18 to the hoist system of the shipping container transport system of the present invention and, in particular, various details connection through only the gooseneck assembly of FIG. 2.

In the final phases of deployment, the front end 105 of the container 104 is again connected to the winch cable 65, but this time only through the hoist assembly 66 of the gooseneck assembly 41 as shown in FIGS. 24 and 25. As shown in FIG. 25, however, it is noted that at this juncture it may be desirable to connect the cable 65 to the readily available purchase at the bottom 113 of the container 104. In any case, as shown in FIG. 24, the front end 105 of the container 104 is again raised to enabled the tall jack stands 118 to be removed and for the dolly to be operably positioned as shown in FIG. 24.

With the dolly 71 in operable position, the front end 105 of the container 104 is lowered to place the container 104 in the container brackets 81 as shown in FIGS. 26 and 31 and the remaining medium height jack stands 115 are removed. At this juncture, it is noted, the holes 111 through the bottom surfaces 110 of the corner castings 107 should be in place about the respective posts 44 extending upwardly from the platforms 43 formed on the gooseneck assembly 41. With the container 104 in this position, the dolly 71 is frictionally secured to the container 104 by driving bolts 86 through threaded holes 85 provided through the side panels 84 of each container bracket 81. Additionally, as shown in the Figures, a strap 119 should be affixed over the container 104. To this end, one or more ratchet mechanisms may, if desired, be integrated within the dolly 71.

Finally, as better understood with reference to FIGS. 27 through 30, the barrel slide bolt assemblies 55 are operated to drive the bolts 57 through the barrels 56 and orifices 54 of the backstops 52 and through the holes 109 in the fronts faces 108 of the corner castings 107, thereby securely affixing the container 104 to the gooseneck assembly 41. The container may then be freely transported with the medium duty truck 101. In order to remove the container 104 at the desired destination, the steps are simply reversed.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. In any case, because the scope of the present invention is much broader than any particular embodiment, the foregoing detailed description should not be construed as a limitation of the scope of the present invention, which is limited only by the claims appended hereto.

What is claimed is:

1. A container transport system for transporting intermodal freight containers by medium duty truck, said container transport system comprising:
   a gooseneck assembly adapted for towing by a medium duty truck, said gooseneck assembly comprising:
      a first platform adapted to support a first corner casting of an intermodal freight container, said first platform comprising a first post adapted to be matingly received through a bottom orifice of first corner casting;
      a second platform adapted to support a second corner casting of an intermodal freight container, said second platform comprising a second post adapted to be matingly received through a bottom orifice of second corner casting;
      a hoist assembly adapted to lift an end of said intermodal freight container; and
      means for securing an intermodal freight container in place atop said first platform and said second platform; and
   a dolly adapted for supporting said intermodal freight container, said dolly comprising:
      a bogie frame constructed atop a wheeled suspension system;
      a pair of brackets supported by said bogie frame, said brackets being adapted to engage opposite sides of said intermodal freight container;
      a gin pole assembly, wherein:
         said gin pole assembly is stowable in a recess formed within said bogie frame at a height less than the height of said brackets; and
         said gin pole assembly is cooperatively adapted with said hoist assembly to lift an end of said intermodal freight container; and
   wherein said dolly is separable from said gooseneck assembly.

2. The container transport system for transporting intermodal freight containers by medium duty truck as recited in claim 1, wherein each said bracket of said dolly comprises an orifice adapted to releasably receive therethrough one of said posts of said first platform and said second platform.

3. The container transport system for transporting intermodal freight containers by medium duty truck as recited in claim 1, wherein said each said bracket of said dolly comprises a means for securing said dolly to said gooseneck assembly.

4. The container transport system for transporting intermodal freight containers by medium duty truck as recited in claim 3, wherein each said bracket of said dolly comprises an orifice adapted to releasably receive therethrough one of said posts of said first platform and said second platform.

5. The container transport system for transporting intermodal freight containers by medium duty truck as recited in claim 1, wherein said hoist assembly comprises a tripod formed in an uppermost portion of said gooseneck assembly.

6. The container transport system for transporting intermodal freight containers by medium duty truck as recited in claim 1, wherein said hoist assembly further comprises a pulley affixed to an apex of said tripod.

7. The container transport system for transporting intermodal freight containers by medium duty truck as recited in claim 1, wherein said means for securing an intermodal freight container in place atop said first platform and said second platform comprises a barrel slide bolt assembly.

8. The container transport system for transporting intermodal freight containers by medium duty truck as recited in claim 1, wherein said gin pole assembly comprises a selectively deployable tripod having a pulley affixed thereto.

* * * * *